INVENTOR.
WILLIAM H. TYGART
BY
[signature]
Agent

INVENTOR.
WILLIAM H. TYGART
BY George C. Sullivan
Agent

INVENTOR.
WILLIAM H. TYGART
BY George C. Sullivan
Agent

Feb. 4, 1969

W. H. TYGART 3,426,150

SYSTEM FOR FM TRANSMISSION OF CARDIOLOGICAL DATA OVER TELEPHONE LINES

Filed Sept. 27, 1965

INVENTOR.
WILLIAM H. TYGART

BY George C. Sullivan
Agent

United States Patent Office 3,426,150

Patented Feb. 4, 1969

3,426,150

SYSTEM FOR FM TRANSMISSION OF CARDIOLOGICAL DATA OVER TELEPHONE LINES

William H. Tygart, Marietta, Ga., assignor to Lockheed Aircraft Corporation, Burbank, Calif.

Filed Sept. 27, 1965, Ser. No. 490,359

U.S. Cl. 179—2 20 Claims

Int. Cl. H04m *11/00;* H03b *5/08*

ABSTRACT OF THE DISCLOSURE

A portable transistorized data transmission apparatus especially suited for transmitting cardiological or other medical data as produced by the body of a patient over a conventional telephone circuit for evaluation at a remote location. The apparatus, which is designed to be capable of use by technically unskilled persons, converts the body electrical signals to a frequency-modulated audio signal which is acoustically coupled to a microphone such as a telephone handset. A switching arrangement permits the apparatus to be used with a full set of cardiological electrodes so that a number of modes of cardiological data may be transmitted, and the voltage controlled FM oscillator of the apparatus can be provided with square wave calibration pulses causing a modulation signal of a known value to permit calibration of instruments at the remote end of the communication link. The oscillator includes band-elimination circuitry to render it incapable of producing an output within a certain narrow frequency band used by the telephone company for signaling. Provision is made to overcome the adverse effects of galvanic body electrode potentials.

This invention relates in general to data transmission apparatus and in particular to apparatus whereby cardiological or other medical data may easily be transmitted over a conventional voice communication link.

Despite the rapid advances made by medical science regarding the treatment and cure of various diseases and illnesses, there remains a number of illnesses which annually take a large toll in human life. Heart disease ranks high on the list of such illnesses, with heart attacks of varying severity incapacitating or killing many people.

One of the basic diagnostic instruments used by the doctor in the treatment of heart disease is the electrocardiograph. Such an instrument, referred to hereinafter as a cardiograph recorder, detects and measures the minute electrical potentials existing between various points on the body and caused by action of the heart muscle, and makes a permanent record, called a cardiogram, of these potentials.

Cardiographic analysis of a person afflicted with heart disease frequently is required of the person at all stages of the disease. Even while the person is convalescing from one or a series of heart attacks, the doctor may wish to obtain daily cardiograms from this person so that a constant check can be made of the condition of his heart. This requires that the patient present himself at the office of the doctor whereupon electrodes are attached to the body of the patient, the electrodes are electrically connected to the cardiograph recorder, and then a cardiogram is made. This consumes a large amount of time both for the patient, who may be required to travel in a physically weakened condition to and from the office of the doctor, and for the doctor and/or his technician, who must spend time connecting and disconnecting the electrodes and cardiograph recorder.

It frequently occurs that a person will be striken by a heart attack at a time or place where it is inconvenient or impossible to obtain the cardiogram necessary for a meaning for diagnosis of his condition. This could occur by way of example in airplanes, ships, at hotels, or other locations physically removed from the patient's home and doctor; or, even in the home of the patient. Even if it were feasible to provide cardiograph recorders at such locations, it would also be necessary for a doctor to be constantly present so that the cardiogram could be taken and interpreted. Except for the very wealthy, this obviously is not a practical procedure.

The above problems could be obviated or greatly minimized and the diagnostic capabilities of persons suffering from heart disease greatly enhanced by the provision of apparatus whereby the signals generated by the heart muscle could conveniently be transmitted to a a remote location at which a cardiogram could be made. To be practicably acceptable both to the medical profession and to the lay patient, such apparatus would have to be operable by the patient who is neither a doctor nor an engineer, and preferably, for reasons which will be set forth more fully below, by a person who may have had little or no prior instruction in its use. Furthermore, such apparatus must have sufficient fidelity of reproduction so that the cardiogram made at the receiving location shows no material degradation from the cardiogram that would be made were the patient actually present. Further yet, such apparatus must be sufficiently simple in construction and manufacture so that the heart patient of average economic means can afford to obtain it.

An apparatus as envisioned above requires the use of a communication link from the patient to the office or other location whereat the cardiogram actually is made. In view of the present widespread use of the common telephone, it is obvious that the telephone provides the most economical and readily available communication link for such a purpose; however, apparatus of the prior art which has attempted to solve the above problem usually has required direct electrical connection to the telephone system at the transmitting and/or receiving ends thereof; such apparatus also frequently has required leasing of special private lines capable of transmitting cardiological data in the form presented by such apparatus. Such techniques clearly do not provide a solution to the problems outlined above.

In an effort to overcome the problems outlined above and to provide a satisfactory apparatus for the remote transmission of cardiological data, a transmitter unit has been devised which accepts the electrical potentials generated by the operation of the heart, converts these potentials to an audible signal whose change in frequency is a function of the potential, and communicates this audible signal directly to the microphone of a telephone, radiotelephone, or other voice communication link. Suitable apparatus, not forming a part of this invention, positioned adjacent a telephone at the receiving end accepts the audible signal reproduced thereat and reconverts the signal to an electrical potential that is a faithful reproduction of the potential generated by the body and which may be supplied to a conventional cardiograph recorder.

Accordingly, it is an object of this invention to provide improved apparatus for the remote transmission of data.

Another object of this invention is to provide improved apparatus for the remote transmission of cardiological data.

A further object of this invention is to provide apparatus for the remote transmission of cardiological data whereby such apparatus may utilize as a communication link a conventional voice transmission system.

Still another object of this invention is to provide apparatus for the remote transmission of cardiological data wherein the electrical potentials produced by the body are converted to signals within the range of audibility.

Yet another object of this invention is to provide apparatus for the remote transmission of cardiological data over a conventional voice transmission link without requiring electrical connection of the apparatus to any portion of the link.

A still further object of this invention is to provide apparatus for the remote transmission of cardiological data which is readily operated by persons lacking medical and technical expertise.

Another object of this invention is to provide apparatus for the remote transmission of cardiological data that is sufficiently compact to be carried customarily by a person in anticipation of sudden need in himself or in others for the apparatus.

Another object of this invention is to provide apparatus for the remote transmission of cardiological data that is sufficiently inexpensive in manufacture to permit the acquisition thereof by persons of modest economic means.

Another object of this invention is to provide apparatus for the remote transmission of cardiological data which enables the cardiograph to be calibrated without the need for precise control of supply voltage in the apparatus.

Still another object of this invention is to provide apparatus for the remote transmission of cardiological data over a voice communication channel which readily permits the channel to be used for voice communication at the option of the operator.

A further object of this invention is to provide an improved oscillator circuit.

An additional object of this invention is to provide an electrical oscillator circuit that is incapable of producing an output at certain frequencies within a nominal range of oscillator operation.

The exact nature of this invention as well as other objects and advantages thereof will be readily apparent from consideration of the following specification relating to the annexed drawings in which.

Stated generally, the embodiment of the invention set forth herein receives electrical impulses gathered from the body by suitable electrodes, amplifies these impulses, and then applies the amplified impulses to an oscillator whose frequency change is dependent upon the amplitude of the signal applied thereto. The nominal or quiescent frequency of this oscillator and the extent of deviation from this nominal frequency are chosen so that the oscillator output, when converted to audible sound by a suitable transducer, can be supplied to and transmitted by voice communication apparatus as exemplified by the conventional telephone. The necessary circuitry to perform these functions is contained in a package which conveniently is capable of being disposed adjacent the mouthpiece of a conventional telephone handset, and the apparatus is provided with a muting switch whereby the oscillator is disabled to enable the telephone to be used for normal voice communication. The transmitter is equipped to permit calibration of the cardiograph used at the receiving end according to the calibration convention of cardiology.

Figure 2:
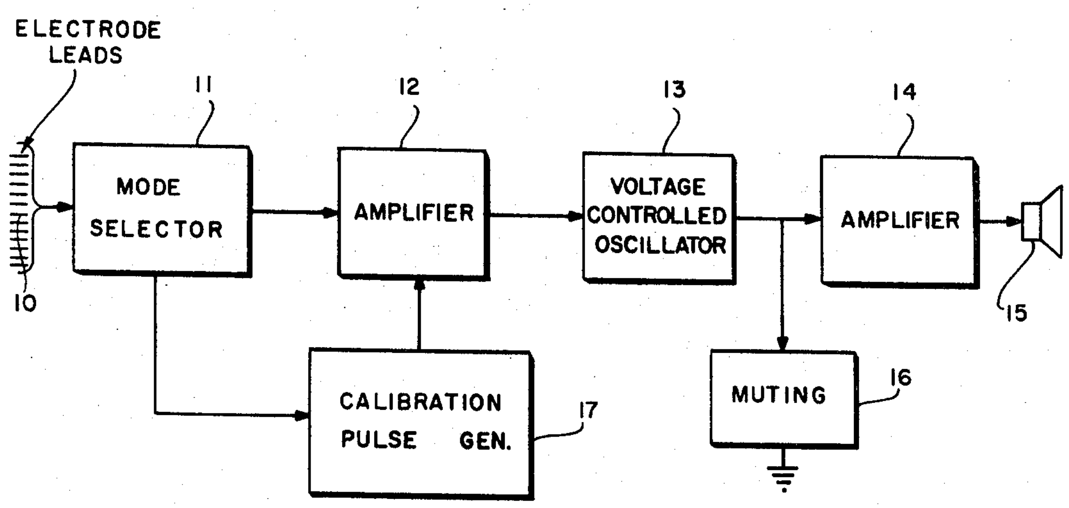
FIGURE 2 shows a block diagram of the circuitry contained in the embodiment shown in FIGURE 1.

More specifically and with reference to FIGURE 2, wherein an embodiment of this invention is depicted in the form of a block diagram, there is shown at 10 a plurality of electrical leads which extend to corresponding electrodes positioned on a patient (not shown). Placement of the leads on the patient will not be detailed herein inasmuch as such information is known to those skilled in the field of cardiology. Electrode leads 10 pass to mode selector switch 11 which functions to select the leads connected to the desired electrode or electrodes and to connect these leads to amplifier 12. There the relatively feeble voltages, in the order of one millivolt or more, developed by the heart are amplified and passed on to voltage controlled oscillator 13.

The components of oscillator 13 are selected so that when no input voltage is present to be amplified by amplifier 12, the oscillator operates at a frequency within the range of audibility and preferably within that range of frequencies for which communications links used primarily for speech transmission are designed. The operating frequency of oscillator 13 is deviated from its normal value when a signal from amplifier 12 is applied thereto, so that the instantaneous frequency of the oscillator is a function of the voltage amplitude measured by the electrodes applied to the body and, thus, is a function of the operation of the heart.

The output of oscillator 13 is passed to amplifier 14 and then is supplied to electro-acoustic transducer 15. Muting circuit 16 functions at the control of the operator to shunt the output of oscillator 13 whereby the apparatus momentarily is silenced to permit transmission of speech over the voice communication circuit being used and for another purpose to be set forth presently.

A calibration pulse generator 17 functions at the control of mode selector switch 11 to apply a standard signal to amplifier 12 to enable calibration of cardiograph recorder at the receiving end of the communication link.

Figure 3:
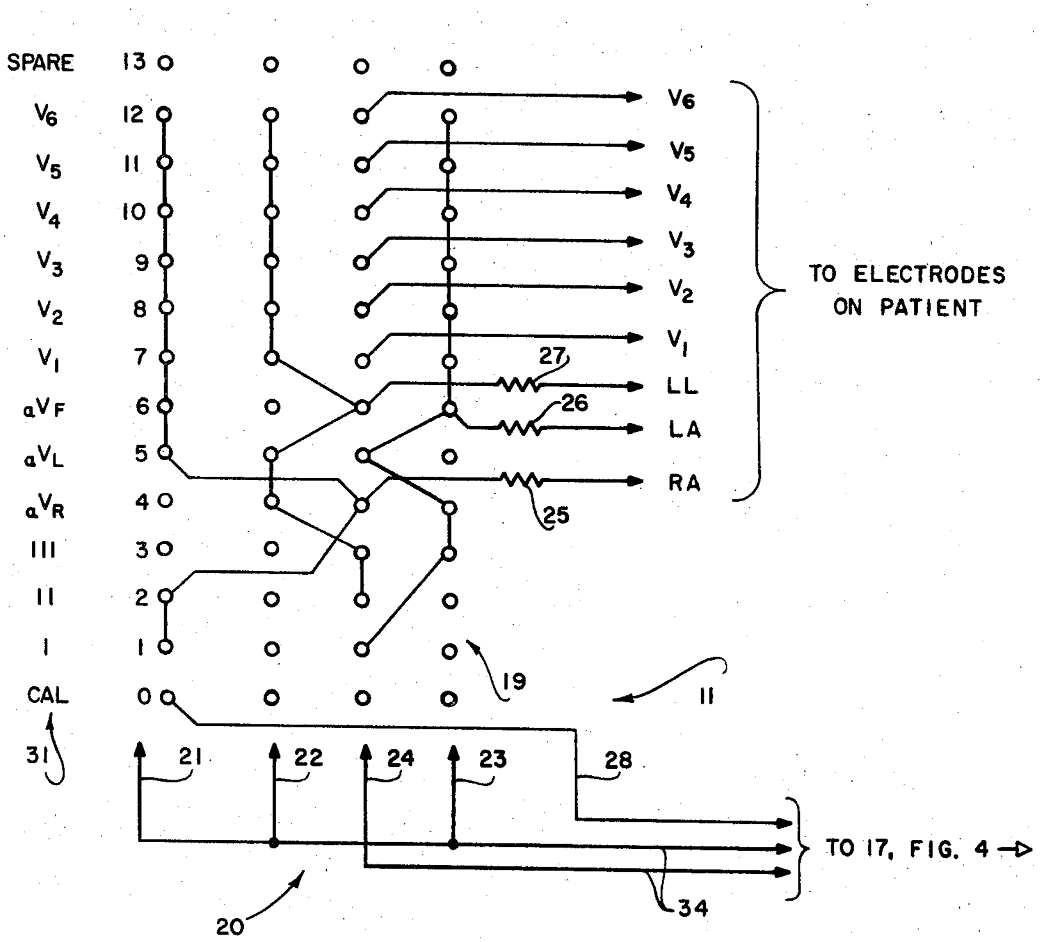
FIGURES 3, 5 and 5 show a schematic diagram of the circuitry of the embodiment as shown in block diagram in FIGURE 2.
Figure 4:
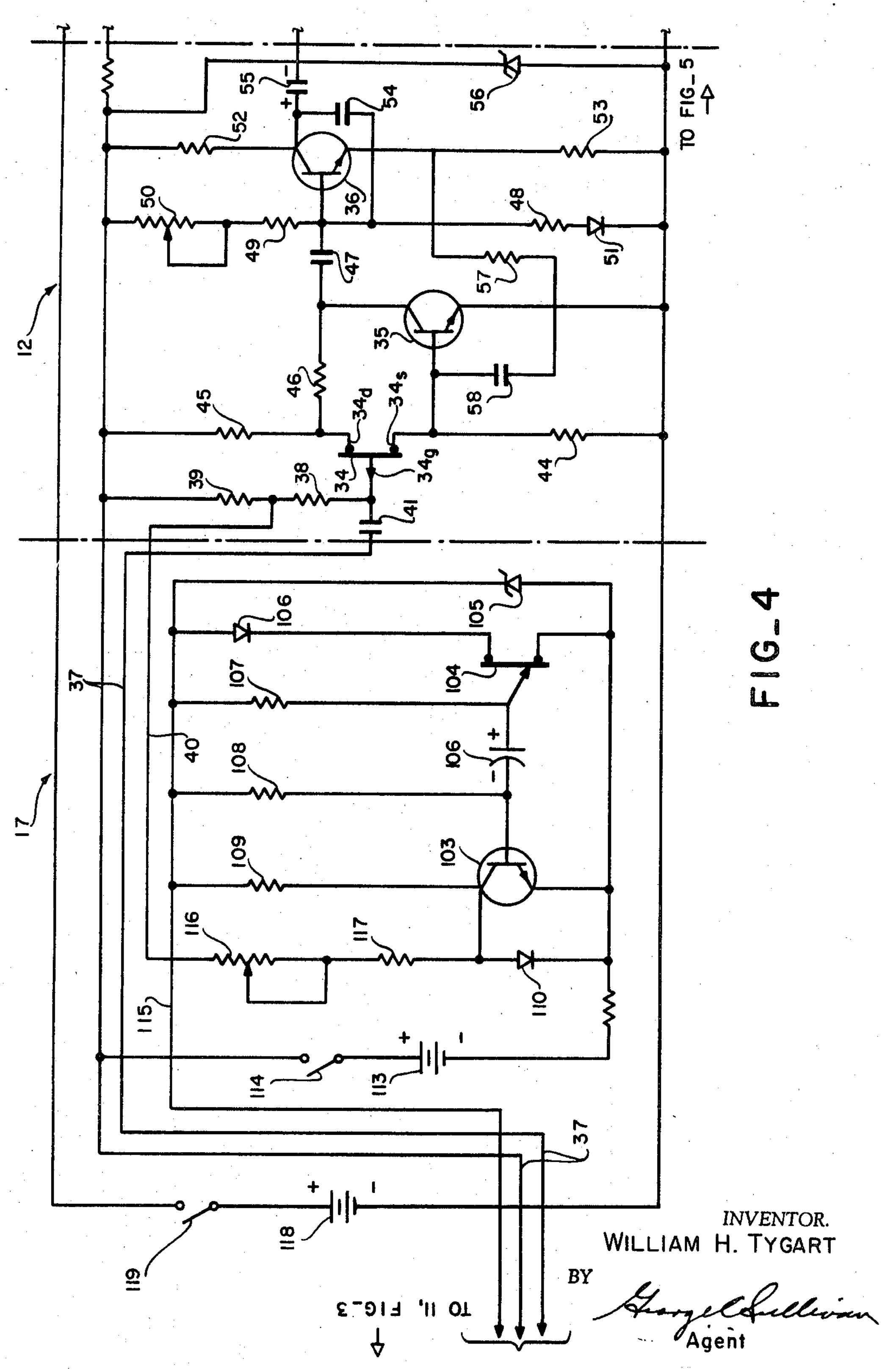
Figure 5:
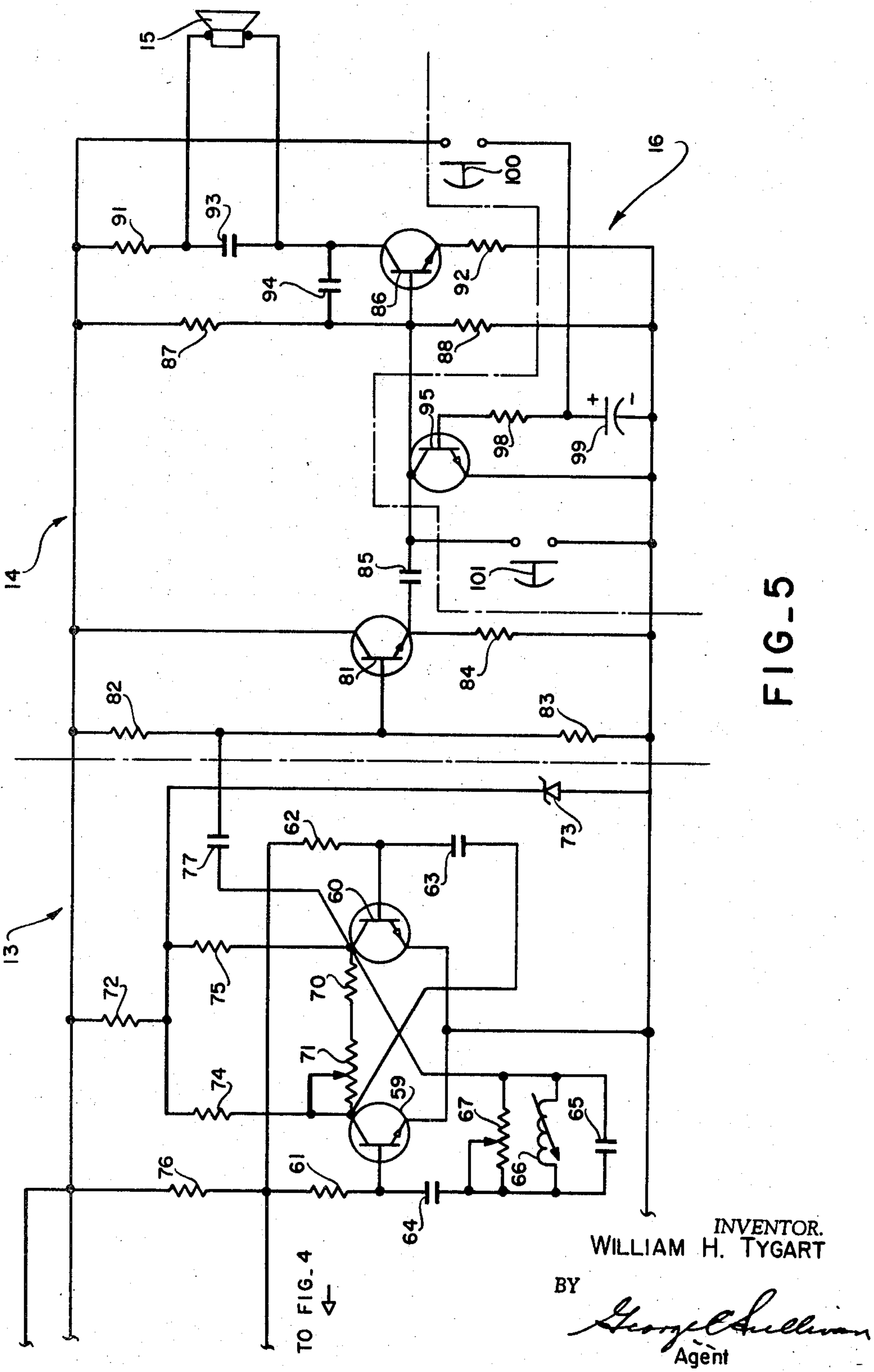

Turning now to FIGURES 3 and 4 for a more detailed examination of the circuitry contained in this embodiment and set forth in block form in FIGURE 2, there is shown in FIGURE 3 the mode selector indicated generally at 11. The mode selector comprises a four-pole multiposition switch 19 which may, by way of example, be of the rotary type and have fourteen positions. Switch 19 includes an armature 20 of which armature members 21, 22 and 23 are electrically interconnected. It can be seen that in the contact column wiped by armature member 21 switch positions 5 through 12 are connected in common, and these positions are connected to position 4 of the contact column corresponding to armature member 24 and to positions 2 and 1 of the first-mentioned contact column. The aforementioned common connections are connected through resistance 25 to the right arm of the patient. In the contact column corresponding to armature member 22, positions 4, 5 and 7 through 12 are connected in common with positions 6, 3 and 2 of the contact column corresponding to armature member 24; these common connections extend through resistance 27 to the left leg of the patient. Finally, positions 3, 4 and 6 through 12 of the contact column corresponding to armature member 23 are connected in common with positions 1 and 5 of the contact column corresponding to armature member 24, and these common connections extend through resistance 26 to the left arm of the patient. Contacts 7, 8, 9, 10, 11 and 12 of armature member 24 extend, respectively, to the $V_1$, $V_2$, $V_3$, $V_4$, $V_5$ and $V_6$ leads on the patient. Placement and location of these various leads on the patient is well known to those skilled in cardiology.

Position 13 of the switch has been left vacant to permit accommodation of the mode selector to the desires of the particular cardiologist or to accommodate an additional electrode. Switch position 0 has lead 28 connected to the contact column corresponding to armature member 21 to energize calibration pulse generator 17, as described in greater detail below. In addition to being numerically designated, the switch positions are also designated as at 31 by the particular cardiographic mode to which the switch position corresponds.

Referring now to FIGURE 4 of the drawing, there is shown a schematic diagram of amplifier 12, voltage controlled oscillator 13, amplifier 14, transducer 15, muting circuit 16, and calibration pulse generator 17, as designated by appropriate reference numerals in the figure.

The amplifier 12 comprises three stages including a field effect transistor 34 and conventional transistors 35 and 36. The input signal from the set of electrodes chosen by selector switch 19 is applied through leads 37 and capacitance 41 to the gate 34*g* of field effect transistor 34. This input signal is applied across a voltage divider comprised by resistances 38 and 39, with lead 40 as connected to the junction of resistances 38 and 39 serving to supply calibration pulses to the field effect transistor in a manner described more fully below. Capacitance 41 functions to block the application of galvanic potentials, as produced through the interaction of the electrodes with the body of the subject to whom the electrodes are applied, from application to gate electrode 34*g*.

Field effect transistor 34 is connected as a source follower, with source electrode 34*s* connected to the negative side of the power source through resistance 44. Not only the current supplied to drain electrode 34*d* but also the collector current for transistor 35, located in the next following stage of amplifier 12, passes through resistance 45 to provide a measure of temperature stabilization for field effect transistor 34. Output voltage derived across resistance 44 is directly coupled to the base of transistor 35. The use of a field effect transistor as a source follower is found to provide for amplifier 12 an input stage having high input impedance and additionally yielding some net gain to the input signal.

The second stage of amplifier 12, comprising transistor 35, is supplied with collector current through resistance 46, and the output taken across the collector of this stage is coupled through capacitance 47 to the base of transistor 36. Bias current for transistor 36 is provided by means of a voltage divider comprising fixed resistances 48 and 49 and variable resistance 50, with diode 51 being series connected to provide temperature stabilization of the bias circuit. The collector of transistor 36 is connected through resistance 52 to the positive potential line, while the emitter of this transistor is connected through resistance 53 to the negative potential line. Capacitance 54 is connected between the collector and the base of transistor 36, while the output signal from this transistor is coupled through capacitance 55 to the input of voltage controlled oscillator 13. Voltage regulation for amplifier 12 is provided by Zener diode 56.

Amplifier 12 incorporates a feedback circuit, for a purpose to be described below, which includes resistance 57 in series with capacitance 58. The signal present across resistance 53 is fed back to the base of transistor 35, with the amount of feedback being effectively adjustable with variable resistance 50.

Voltage controlled oscillator 13 comprises a pair of transistors 59 and 60, with the input signal as coupled through capacitance 55 being supplied to the base of transistor 59 through resistance 61 and to the base of transistor 60 through resistance 62. A feedback circuit is provided from the collector of transistor 59 through capacitance 63 to the base of transistor 60, while a second feedback circuit is provided from the collector of transistor 60 through capacitance 64 to the base of transistor 59. Contained in series with this second feedback circuit is a parallel resonant circuit including capacitance 65, inductance 66 and variable resistance 67. This circuit is chosen to resonate at a predetermined frequency for a purpose which becomes apparent below. The Q of this resonant circuit is adjusted with variable resistance 67.

The voltage controlled oscillator circuit is completed with resistance 70 and variable resistance 71 connected in series between the collectors of transistors 59 and 60, with variable resistance 71 functioning to adjust the amount of frequency deviation produced by an input signal of a given amplitude. A regulated power supply for the voltage controlled oscillator is furnished by a divider circuit comprising resistance 72 and Zener diode 73, with this voltage being applied to the transistors through resistances 74 and 75, respectively. Bias voltage is supplied to the base of each of transistors 59 and 60 through resistance 76 connected to the source of positive potential.

The components of voltage controlled oscillator 13 preferably are chosen such that in the absence of an input signal thereto the oscillator produces a carrier signal having a frequency chosen within the range of audibility, for example, 2,000 c.p.s. An input signal received from amplifier 12 causes deviation of this carrier signal in a direction and to an extent determined by the polarity and amplitude of this input signal.

The output of voltage controlled oscillator 13 is coupled through capacitance 77 to amplifier stage 14, which comprises two relatively straight forward stages of transistor amplification. The first of these stages includes a transistor 81 receiving at the base thereof the signal coupled through capacitance 77. Resistances 82 and 83 provide operating point bias for transistor 81 and the output signal from this transistor, taken across resistance 84, is coupled through capacitance 85 to the base of second stage transistor 86. Resistances 87 and 88 provide bias current for transistor 86, with resistances 91 and 92 being contained respectively in the collector and emitter circuits of this transistor.

Connected in shunt across capacitance 93 and accordingly contained in the collector circuit of transistor 86 is transducer 15, which may, by way of example only, be of the electromagnetic variety. Capacitance 94 is connected between the collector and the base of transistor 86.

Muting circuit 16, which selectively functions to remove substantially all of the input signal from the base of transistor 86, comprises a transistor 95 connected between the base of transistor 86 and the negative potential supply line to cause shunting of the signal coupled through capacitance 85 and of the bias current for transistor 86 when transistor 95 is placed in a substantially conductive state, thereby silencing the output from transducer 15. Control of transistor 95 is accomplished by means of an RC circuit including resistance 98 and capacitance 99. A source of positive potential is applied through switch 100, which may be of the momentary contact normally-open variety, to the junction of resistance 98 and capacitance 99. Momentary closure of switch 100 causes capacitance 99 to charge to substantially the full value of the supply potential, for example 9 volts, and this positive potential is applied through resistance 98 to the base of transistor 95 to place this transistor in a substantially conductive state, thereby causing shunting of the signal coupled from transistor 81 and of the bias current applied to transistor 86, and producing muting of the amplifier stage 14. After switch 100 is returned to the open condition, capacitance 99 slowly discharges through resistance 98 and the base-emitter circuit of transistor 95. As this takes place the bias on transistor 95 is reduced to a point whereat this transistor again becomes substantially nonconductive, whereupon the muting circuit ceases to function. By way of example, resistance 98 and capacitance 99 may be chosen so that momentary operation of switch 100 produces approximately a 13 second muting effect.

Switch 100 may be mechanically interconnected with selector switch 19 such that each actuation of switch 19 to a different position causes momentary closure of switch 100, this being desirable for a reason set forth below. This mechanical interconnection could be produced by a multi-lobe cam contained on a selector switch 19 of the rotary type or, alternatively, the function of switch 100 could be produced by an additional set of appropriate contacts contained on the selector switch.

Momentary muting of the output of amplifier 14 without the time delay effect is obtained through the closure of switch 101, which is in parallel with transistor 95 and which also may be the normally-open momentary contact variety.

Calibration pulse generator 17 functions to provide as an input to amplifier 12 a series of square wave pulses, each pulse of which has a predetermined amplitude of, for example, one millivolt. This pulse generator, which as shown may be connected to be operative only when selector switch 19 is in the zero, or "calibrate," position, comprises a transistor 103 connected as a switching device and receiving drive pulses provided by a unijunction transistor 104. Transistor 104 may have a diode 106 in a base circuit thereof for temperature stabilization purposes and may be supplied with a stabilized voltage across Zener diode 105.

The pulsing rate of unijunction transistor 104 is determined by the chosen values of capacitance 106 and resistance 107, with capacitance 106 being connected between the junction of unijunction transistor 104 and the base of transistor 103. Resistance 108 is connected between the base of transistor 103 and a source of positive potential, while resistance 109 is connected between the collector of transistor 103 and the source of positive potential.

Transistor 103 is connected in shunt across diode 110, and this transistor functions at the control of unijunction transistor 104 as a switch which alternately opens and closes to provide a controlled shunt across diode 110. Diode 110 is chosen for amplitude clamping purposes to ensure that the output of calibration pulse generator 17 does not exceed a predetermined level. Lead 40 connects the pulse generator to the input of amplifier 12.

Operating power for pulse generator 17 is supplied by battery 113 connected through switch 114 to one of the leads 37 connected to the armuture of selector switch 19. Line 115, to which the components of pulse generator 17 are connected and which normally would be returned directly to the source of positive potential, is instead connected to the "calibrate" position of switch 19 to ensure that pulse generator 17 can only operate when the calibration mode is selected and when switch 114 is closed.

Operating voltage for those portions of the apparatus excluding calibration pulse generator 17 is provided by means of a battery 118 connected through switch 119 to provide operating potential to the various components. Both battery 118 and battery 113 may be of the rechargeable nickel-cadmium variety, such batteries providing the convenience of repeated rechargeability and having the further advantage of a relatively flat discharge curve to lessen the problems of voltage stabilization and frequency stability due to battery discharge. If nickel-cadmium batteries are selected, the charging circuit (not shown) for such batteries may be contained in a separate package at the option of the constructor, with appropriate charging connections being supplied to batteries 118 and 113 to permit convenient recharging of these batteries when the transmitting apparatus is not in use.

Inasmuch as in the embodiment described herein, all of components 11, 12, 13, 14, 15, 16 and 17 are contained within a common housing with the electrode leads to mode selector 11 terminating at a multi-conductor socket mounted in the housing, additional connectors on this socket advantageously may be utilized to perform the functions of switches 114 and 119, switch closure being provided by shunted corresponding elements in the mating plug.

Figure 1:
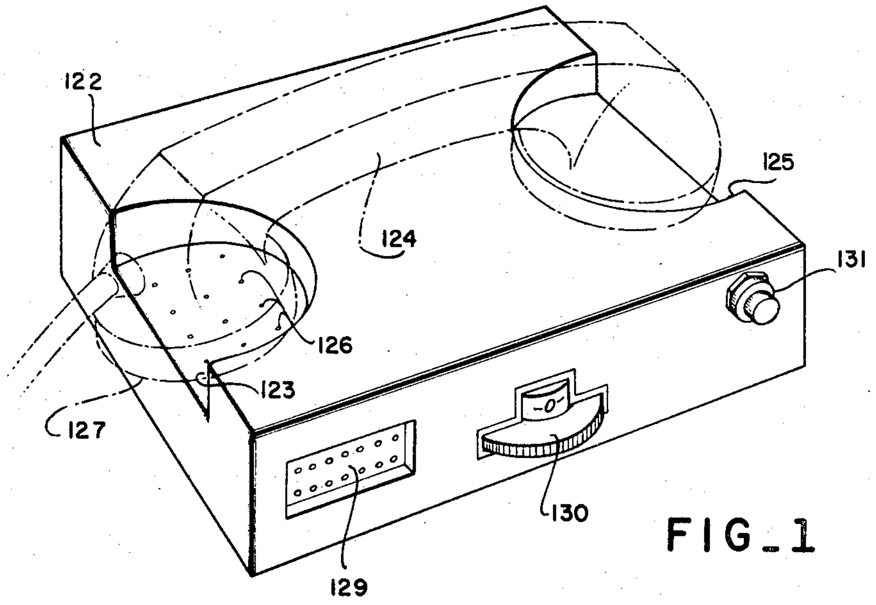
FIGURE 1 shows a pictorial view of apparatus constructed according to an embodiment of this invention.

Because of the intended application of the apparatus of this invention, the components and functions of this embodiment thereof have been developed so that the apparatus can be packaged to permit convenient use with the conventional telephone. An example of such packaging is shown in FIGURE 1, wherein the various components identified as elements 11 through 17 in FIGURE 2 are contained within a case 122 having at one end thereof a recess 123 configured to receive the mouthpiece 127 of a conventional telephone handset, shown in phantom at 124. A recess or similar physical detail 125 is provided at the opposite end of case 122 to permit convenient positioning of the earpiece of the handset therein, although in this embodiment of the invention no portion of the apparatus electronically or acoustically interacts with the earpiece of the telephone. Physical detail 125 preferably is designed to permit a user of the telephone and this apparatus to position his ear with respect to the telephone such that incoming conversation on the telephone may be heard by the user. Transducer 15 is positioned within the case 122 adjacent perforations 126 to permit passage of audio from the transducer to the mouthpiece 127 of telephone handset 124.

The remainder of the controls and connections are situated on the side of case 122. Socket 129 permits connection of the apparatus contained within the case to suitable electrodes positioned on the patient. Knob 130, which conveniently may be of the thumb wheel variety, is mechanically connected to switch 19 to provide selection of the various cardiograph modes or of the operation of calibration pulse generator 17. Push button 131 provides the switching function of switch 101 to enable momentary muting of the output of amplifier 14.

The operation of the apparatus shown in this embodiment will now be described. Assuming that suitable electrodes have been applied to the patient and that these electrodes have been connected through socket 129 or otherwise to the input of switch 19, transducer 15 of the apparatus is positioned adjacent the microphone of a suitable voice communication link such as mouthpiece 127 of telephone handset 124, as seen in FIGURE 1. This communication link must have at the receiving end thereof suitable apparatus for converting the audio signal, produced by the apparatus of this invention and reproduced at the receiving end, into electrical impulses substantially identical to the electrical heart impulses sensed by the electrodes, such apparatus being exemplified by United States patent application Ser. No. 507,819, filed Nov. 15, 1965, for "Apparatus for Reception of Remotely Transmitted Medical Data," assigned to the same assignee as the present invention.

Cardiograph recorders are standardized so that a sensed signal of one millivolt causes a ten millimeter deflection of the recording stylus or other indicating device. So that a cardiograph recorder may be calibrated to this standard prior to recording heart signals transmitted by the apparatus described herein, switch 19 is placed in the "calibrate" position whereby calibration pulse generator switch 17 is enabled to function. In this description of the operation of this apparatus, it is assumed that switches 114 and 119 have been closed and that operating potential is applied to the various components of the apparatus.

Placing calibration pulse generator 17 in the operative state causes unijunction transistor 104 to alternate between a conductive and a nonconductive state, with the rate of switching of unijunction transistor 104 being determined by the charging time of capacitance 106. This operation of unijunction transistor 104 causes switching of transistor 103, connected in shunt across amplitude clamp diode 110, and this switching causes a pulsed interruption of current flowing from battery 113 through lead 40 and resistance 39. The voltage pulses produced across resistance 39 are applied to the gate electrode 34_g_ of field effect transistor 34. Variable resistance 116 is preset at the time of manufacture and calibration of the instrument to provide an input signal from the pulse generator 17 to gate electrode 34_g_ of one millivolt in amplitude, and this variable resistance 116 preferably is completely contained within case 122 so as to be inaccessible to the routine user of the apparatus.

The output from the first stage of amplifier 12, taken at the source follower across resistance 44, is applied to the following two stages of amplification comprised by transistors 35 and 36. The calibration pulses as amplified then are supplied to the input of voltage controlled oscillator 13 to cause the frequency of operation of this oscillator to vary in proportion to the amplitude of the applied input signal. Thus, the calibration pulses cause oscillator 13 to produce as an output a frequency modulated signal having a rate of frequency modulation equal to the repetition rate of the pulses produced by pulse generator 17 and having an extent of frequency deviation that is a function of the amplitude of the signal pulses received by the oscillator.

The output of oscillator 13, comprising the frequency modulated carrier signal, is amplified at 14 by transistors 81 and 86 and then is applied to transducer 15 to produce audible sound in accordance with the frequency modulated carrier signal. In the embodiment shown, this audible sound is acoustically coupled to the transmitter of a voice communication link and the signal produced thereby as reproduced at the receiving end is utilized to provide for application to a cardiograph recorder a series of electrical pulses each of which has a one millivolt amplitude, thus enabling the cardiograph recorder to be adjusted to produce the ten millimeter deflection corresponding to the one millivolt calibration signal giving rise to the frequency modulated carrier in the apparatus of this invention.

Since calibration of the recorder is accomplished at the receiving location by adjusting the recorder stylus, while the recording paper is passing thereby, both for the proper base line or no-signal stylus position and also for the proper ten millimeter stylus deflection position responsive to the one millivolt calibration signal pulses, the provision of a repetitive series of calibration pulses enables calibration to be accomplished more rapidly and with less waste of recorder paper than can be accomplished, for example, with a manually-operated switch for applying at each actuation thereof a one millivolt signal to the input of amplifier 12.

With calibration accomplished, the user of the apparatus may cause to be transmitted signals corresponding to the electrical impulses produced by the heart in each of the accepted modes of cardiography merely by selective positioning of switch 19. As in the case of the voltage pulses produced by the calibration pulse generator, the electrical signals produced through the operation of the heart, as transduced by electrodes applied to the patient, cause the carrier frequency of this oscillator to be deviated in a manner corresponding to the amplitude and rate of fluctuation of the heart signals. The audible output from transducer 15, corresponding to these fluctuations, is acoustically coupled to the voice communication link and the signal produced at the receiving end thereof is applied to a cardiograph recorder to produce a faithful reproduction of the heart signals giving rise to the FM output of the apparatus of this invention.

The human heart typically produces electrical signals ranging from a frequency of almost zero cycles per second to at least 80 cycles per second and having an amplitude of as many as several millivolts. In view of this, and in view further of the fact that the calibration signal consists of a series of essentially square wave pulses having a certain dwell time, it can be seen that the frequency response of the apparatus of this invention and in particular of amplifier 12 thereof must be essentially flat from zero to at least 80 c.p.s.

While in a normal environment and application this frequency response might be accomplished through the use of direct-coupled amplifier stages, this is prohibited in the field of cardiology by the fact that the metallic electrodes applied to the body of the patient exhibit a galvanic action in combination with the body, using the wet conductive substance applied to such electrodes as an electrolyte. Even where there have been devised dry electrodes which may be positioned directly on the body without the deliberate interposition of a conductive substance, normal body perspiration serves as an electrolyte and the EMF across the galvanic cell so produced may be in the order of 300 millivolts, or 300 times greater than the instantaneous amplitude of a typical heart signal. Clearly, the application of this galvanic potential to the input of a direct-coupled amplifier would swamp the heart signal and render this apparatus ineffective to transmit information relating thereto.

This problem is overcome through the inclusion of capacitance 41 which serves to block the galvanically-produced signal from the gate electrode of field effect transistor 34 and thus ensures that amplifer 12 receives from the patient only those signals produced by the action of the heart. It will be noted that calibration pulses produced by generator 17 are applied through lead 40 and do not pass through capacitance 41. However, in switching between the various electrodes applied to the body of the patient, the varying galvanic potentials produced at these electrodes result in a charging or discharging of capacitance 41 immediately upon switching to a particular electrode or combination of electrodes. This charging or discharging of capacitance 41, which commences upon switching and which may continue for several seconds until the charge on the capacitance reaches equilibrium with the newly-applied galvanic potential, causes to be applied to amplifier 12 and voltage controlled oscillator 13 a transient input greatly in excess of the normal signal limits which these components are designed to accept, with the result that the frequency of oscillator 13 is deviated to an extent far greater than the frequency deviation expected during normal operation. In turn, this means that the cardiograph recorder at the receiving end receives a momentary signal responsive to the electrode galvanic potential, with the result that the cardiograph recording stylus may be driven off-scale and the instrument possibly damaged.

The problem of the effect produced by switching of galvanic voltages is overcome according to the present invention by use of muting circuit 16. Immediately before operating switch 19, the operator momentarily closes switch 100 to initiate a timed period of muting during which the level of audio output from transducer 15 is greatly diminished or reduced substantially to an inaudible level. Switch 19 then is operated and the resulting frequency deviation caused by charging or discharging of capacitance 41 produces substantially no audible signal at transducer 15. At the same time, the user of the transmitting apparatus may, if desired, verbally communicate with those at the receiving end of the communication link inasmuch as the audio output from transducer 15 remains silenced for the duration of the delay period. An advantageous period of muting for switching and communicating purposes has been found to be in the order of 13–16 seconds, although this is set forth by way of example only. As mentioned above, switch 100 may either be incorporated with switch 19 or may be physically actuated by the actuation of switch 19, so that an operator of the apparatus need not be required to remember to actuate a separate switch 100 prior to actuation of switch 19.

Manual momentary muting switch 101 is provided for the convenience of the operator to permit momentary muting of the audio output of the apparatus at any time, should the operator wish to communicate verbally over the communication link in use.

The normal tendency of resistance-capacitance coupled amplifiers, when confronted with a DC input signal as essentially provided during the dwell period of each calibration pulse produced by pulse generator 17, or substantially as produced by the low-frequency components of the heart signal, is to cause fall-off of the amplitude of the signal as amplified, because of charging of the input capacitor, so that this signal is not a faithful reproduction of the essentially steady-state portion of the input voltage. In effect, the steady-state portion of the signal undergoes differentiation at least to some extent; then, when the steady-state signal returns to zero, the output tends to swing momentarily to the other side of the zero line because of the differentiation effect. As applied to the transmission of cardiographic information this means, for example, that a positive pulse, as produced by the heart, which quickly returns to zero will be erroneously recorded at the receiving location as a positive pulse which then returns past the zero line and momentarily overshoots the zero line. Of course, such performance is not acceptable where the amplified signal must be used to accurately calibrate a cardiograph recorder and to produce an accurate representation of the cardiogram of a patient.

This problem is substantially alleviated according to this invention by the provision in amplifier 12 of feedback from the output of transistor 36 to the input of transistor 35. This feedback is taken across resistance 53 and is coupled through resistance 57 and capacitance 58 to the base of transistor 35. The extent of the feedback is varied by variable resistance 50, and the feedback as coupled through capacitance 58 and as generated responsive to the fall-off resulting from charging of the amplifier coupling capacitance, in effect provides a "fall-up" component to the input of transistor 35 which, when combined with the normal fall-off resulting from resistance-capacitance coupling, tends to offset this fall-off and thus to make the output of amplifier 12 a more faithful reproduction of the input thereto.

Commercial long-distance telephone circuits of the type found, for example, in the United States are known to incorporate as part of the switching and control mechanisms thereof an apparatus responsive to transmitted signals of a predetermined frequency to cause an established circuit connection to be terminated. For example, transmission of a 2,500 c.p.s. signal over an established long-distance circuit automatically and without warning causes the circuit to be terminated, with the result that communication over this circuit is ended until the circuit can be reestablished by redialing or through the assistance of a telephone operator. Inasmuch as the apparatus of this embodiment operates with a no-signal carrier frequency of 2,000 c.p.s. and since input signals of sufficient magnitude may cause frequency deviation within the range of sensitivity of this automatic cutoff apparatus, some technique must be devised to prevent the apparatus of this invention from inadvertently triggering this automatic cutoff apparatus. The obvious disadvantages produced by the breaking of the communication link in the midst of transmitting a cardiogram do not need elaboration.

To achieve this, there has been included in one of the feedback lines of voltage controlled oscillator 13 a parallel resonant circuit comprising capacitance 65 and inductance 66. These values of capacitance and inductance are chosen to resonate at the particular frequency which is desired to be eliminated (in the example chosen, 2,500 c.p.s.). When a circuit of this type is included in one of the feedback lines of a voltage controlled oscillator as shown, it has been found that as the frequency of operation of the oscillator increases responsive to an input signal thereto to a point approaching the resonant frequency of the L-C circuit in the feedback line so that the impedance of the parallel L-C circuit increases, the frequency of operation of the oscillator suddenly jumps from a frequency just below the resonant frequency to a second frequency just above the resonant frequency. Reduction of the frequency of operation of the oscillator causes a similar jump in operation to a frequency on the lower side of the resonant frequency. Thus, through provision of the resonant circuit in one of the feedback lines of the oscillator, there is established a vacant frequency band into which the oscillator does not enter and over which the oscillator skips in a sudden manner. When the nominal frequency of oscillator operation approaches this vacant band either from a higher or a lower frequency, by means of this technique there is provided a simple and inexpensive technique to ensure that the apparatus of this invention does not produce an output of frequency which might cause breaking of the communication link with which the apparatus is used. Variable resistance 67 adjusts the Q of the resonant circuit and thereby varies the band width thereof.

The use of a frequency-responsive impedance in one or both of the feedback lines is not limited for general application to a parallel L-C circuit as shown. For example, in a suitable application a band pass or band rejection filter might be advantageous.

From the foregoing it will be seen that there has been disclosed a compact, self-contained apparatus for converting the electrical impulses produced by operation of the heart into audible signals suitable for transmission over a telephone or other voice communication link. The apparatus is provided with a minimum of external controls and may be used without need of the exercise of judgment on the part of the operator, so that the apparatus may be used by one who is an expert neither in the fields of medicine nor of engineering while assuring the transmission of signals which correspond faithfully to the potentials of the heart. This is particularly important where the apparatus may be used, for example, in an emergency by one who has never been exposed to such apparatus and who must depend upon written or verbal instructions under the stress of a medical emergency.

The apparatus of this invention is sufficiently compact and light of weight to be habitually carried in, for example, a ladies' handbag or a doctor's medical satchel. In this manner, a doctor visiting a suspected cardiac patient could conveniently cause a cardiograph of the patient to be obtained either at his office or at a remote location specializing in the recording of remote cardiographs. In the same way, a cardiograph of a patient situated in a location, such as an airplane, an ambulance, or a ship at sea, immediately inaccessible to cardiograph recording equipment could nonetheless cause a cardiograph of his heart operation to be taken through the use of the radiotelephone equipment contained on the vehicle. For example, apparatus built according to this invention has been successfully used in conjunction with a conventional automobile radio-telephone to transmit a cardiogram of a person seated in the automobile.

Because the apparatus of this invention is relatively simple of construction and utilizes components which are readily available, it is economically feasible to make this apparatus available on either purchase or a lease basis to the heart patient of even modest means. Through the use of the apparatus according to this invention, the amount of time required to obtain a cardiogram from which is a diagnosis of the patient may be made is substantially reduced, yielding additional valuable time in which treatment according to this diagnosis may be prescribed to the patient.

The apparatus of this invention is not limited in application to the transmission of cardiological data, although the foregoing embodiment has been described in conjunction with this exemplary application. This apparatus can be used as a compact, self-contained information transmission device with regard to any variable which has or can be made to have an electrical output compatible with the input capabilities of this apparatus. The specific values, for example of input voltage and frequency set forth herein are only exemplary of what may be experienced in the transmission of cardiological data, and are not intended to delineate design or performance limitations of this apparatus.

It will be understood, of course, that the foregoing disclosure relates only to a preferred embodiment of the invention and that numerous modifications or alterations may be made therein without departing from the spirit and the scope of the invention as set forth in the appended claims.

What is claimed is:

1. A variable frequency oscillator comprising:

at least one active circuit element;

circuitry means operatively connected with said active circuit element to provide an oscillator circuit capable of producing electrical oscillation at a selectively variable frequency within a predetermined frequency range;

said circuitry means including a feedback path from a first portion of said oscillator circuit to a second portion of said oscillator circuit; and selective control means disposed in said feedback path to impede the passage therethrough of signals having a certain frequency of oscillation corresponding to an unwanted frequency of operation of said oscillator circuit within said frequency range.

2. In a variable frequency oscillator circuit of the type including at least one active circuit element connected in combination with a feedback path from one portion of the oscillator circuit to another portion of the oscillator circuit to render the oscillator circuit capable of establishing electrical oscillation at a selectively variable frequency within a predetermined frequency range, the improvement comprising:

frequency selective circuit means disposed in the feedback path to cause the path to present a relatively high impedance to feedback signals within a certain frequency band found in the predetermined frequency range and to present a relatively low impedance to feedback signals without said certain frequency band so that the oscillator circuit is incapable of operating at oscillation frequencies within said certain frequency band.

3. Apparatus as in claim 2 wherein said frequency selective circuit means comprises a band pass circuit tuned to present a relatively low impedance to signals within predetermined frequency limits.

4. Apparatus as in claim 2 wherein said frequency selective circuit means comprises a band elimination circuit tuned to present a relatively high impedance to signals within predetermined frequency limits.

5. Apparatus as in claim 2 wherein said frequency selective circuit means comprises a resonant circuit.

6. Apparatus as in claim 2 wherein said frequency selective circuit means comprises a parallel resonant circuit, said parallel resonant circuit being disposed in series with the feedback path and being tuned to resonate within said certain frequency band to present a relatively high impedance to the passage of signals within said band and to present a relatively low impedance to signals without said band.

7. A variable frequency oscillator circuit comprising:

a first active circuit element:

a second active circuit element;

a first feedback path from said first active circuit element to said second active element;

a second feedback path from said second active circuit element to said first active circuit element;

said active circuit elements and said feedback paths being connected in circuit to comprise a variable frequency oscillator capable of selective frequency operation within a predetermined frequency range in response to a variable circuit parameter; and selective impedance means in at least one of said feedback paths, the impedance of said selective impedance means being dependent upon the frequency of the signal applied to said one feedback path and being operative to render the oscillator circuit incapable of functioning at certain frequencies.

8. Apparatus as in claim 7 wherein said impedance means comprises a resonant circuit.

9. Apparatus for converting an electrical signal into a signal suitable for transmission over an audio communication link, comprising:

an electrical oscillator circuit responsive to an input electrical signal to be transmitted, said oscillator circuit operable to produce an output signal having a predetermined frequency in the absence of an input signal and deviating from said predetermined frequency in the presence of an input signal, the extent of said frequency deviation being a function of the magnitude of the input signal;

transducer means responsive to said output signal from said oscillator circuit and converting said output signal into an audio signal suitable for introduction into an audio communication link;

said oscillator circuit being of the type including at least one active circuit element connected in combination with a feedback path from one portion of said oscillator circuit to another portion of said oscillator circuit; and additionally including selective circuit means disposed in said feedback path to cause the path to present a relatively great impedance to feedback signals within a certain frequency range so that said oscillator circuit is incapable of operating at oscillation frequencies within said range.

10. Apparatus as in claim 9 wherein said selective circuit means comprises a resonant circuit.

11. Apparatus as in claim 10 further comprising:

input circuitry connected to receive an electrical signal and to communicate this signal to the input of said oscillator circuit, said input circuitry including means preventing the application to said oscillator circuit of any D.C. potential present at the source of electrical signals.

12. Apparatus as in claim 11 further comprising:

muting means connected to permit selective silencing of the audio output of said transducer means.

13. Apparatus for receiving electrical signals from plural sources on an organism and for selectively converting these electrical signals into a signal suitable for transmission over an audio communication link comprising:

switching means connected to receive electrical signals from the plural sources, said switching means being operable to establish communication between a desired combination of electrical signals and the output of said switching means;

an electrical oscillator operative to produce a carrier signal having a predetermined frequency within the range of audibility in the absence of an input signal applied thereto, said oscillator being responsive to the amplitude of the desired combination of electrical signals as selected by said switching means to cause frequency deviation of said carrier signal, the extent of said frequency deviation being a function of said amplitude;

transducer means responsive to said carrier signal for producing an audio signal suitable for introduction into an audio communication link;

coupling means connected to prevent said oscillator from being responsive to any D.C. potential impressed on the electrical signals produced by the organism; and muting means connected to permit selective silencing of the audio output of said transducer means.

14. Apparatus as in claim 13 wherein:

said muting means is operative upon selection thereof to cause silencing of the audio output of said transducer means for an interval of time necessary to permit said coupling means to become adjusted to a D.C. potential newly applied thereto as a result of an actuation of said switching means.

15. Apparatus as in claim 14 wherein:

said muting means is operative in response to actuation of said switching means to commence said timed interval of audio silence.

16. Apparatus for converting an electrical signal into a signal suitable for transmission over an audio communication link comprising:

an amplifier section having an input portion capacitively connected to receive electrical input signals and an output portion for supplying an amplified replica of the electrical input signals, said input signals including short-term steady-state signal components subject to amplitude falloff caused by said capacitive coupling and also including A-C signal components;

a feedback circuit connected to said output portion to receive the amplified input signals including any fallen-off short term steady state components present and connected to supply a feedback signal to said input portion;

said feedback circuit including resistance and capacitance means having a time constant causing said feedback signal to be limited essentially to said fallen-off short term steady state signal components;

said feedback circuit connected in a polarity such that the amplitude of the fallen-off signal components fed back to said input portion adds to the input signals present thereat and giving rise to said feedback signals, so as to at least partially nullify the amplitude fall-off of the short term steady state components of the input signal;

an oscillator circuit responsive to the output of said amplifier section and operable to produce an output signal having a predetermined frequency in the absence of an input signal to said amplifier section and deviating from said predetermined frequency in the presence of such an input signal, the extent of such frequency deviation being a function of the magnitude of the input signal; and transducer means responsive to said output signal from said oscillator circuit for producing an audio signal suitable for introduction into an audio communication link.

17. Apparatus for receiving electrical signals from plural sources on an organism and for selectively converting these electrical signals into a signal suitable for transmission over an audio communication link comprising:

switching means connected to receive electrical signals from the plural sources, said switching means being operable to establish communication between a desired combination of electrical signals and the output of said switching means;

an electrical oscillator operative to produce a carrier signal having a predetermined frequency within the range of audibility in the absence of an input signal applied thereto, said oscillator being responsive to the amplitude of the desired combination of electrical signals as selected by said switching means to cause frequency deviation of said carrier signal, the extent of said frequency deviation being a function of said amplitude;

transducer means responsive to said carrier signal for producing an audio signal suitable for introduction into an audio communication link;

calibration pulse producing means including a pulse generator selectively producing a repetitive chain of output pulses having substantially a square waveform of predetermined amplitude, the operation of said pulse generator being controlled by said switching means;

said pulse generator being connected to selectively apply said output pulses to said oscillator to cause a certain pulsed frequency deviation of the carrier signal so that the audio output from said transducer means indicates the transmission of an input signal having said predetermined amplitude.

18. In an oscillator circuit of the type including at least one active circuit element connected in combination with a feedback path from one portion of the oscillator circuit to another portion of the oscillator circuit to render the oscillator circuit capable of establishing electrical oscillation, the improvement comprising:

frequency selective circuit means disposed in the feedback path to cause the path to present a relatively high impedance to feedback signals within a certain frequency region and a relatively low impedance to feedback signals without said certain frequency region so that the oscillator circuit is incapable of operating at oscillation frequencies within said certain frequency region, said frequency selective circuit means comprising a band pass circuit tuned to present a relatively low impedance to signals within predetermined frequency limits.

19. In an oscillator circuit of the type including at leeast one active circuit element connected in combination with a feedback path from one portion of the oscillator circuit to another portion of the oscillator circuit to render the oscillator circuit capable of establishing electrical oscillation, the improvement comprising:

frequency selective circuit means disposed in the feedback path to cause the path to present a relatively high impedance to feedback signals within a certain frequency region and a relatively low impedance to feedback signals without said certain frequency region so that the oscillator circuit is incapable of operating at oscillation frequencies within said certain frequency region, said frequency selective circuit means comprising a band elimination circuit tuned to present a relatively high impedance to signals within predetermined frequency limits.

20. In an oscillator circuit of the type including at least one active circuit element connected in combination with a feedback path from one portion of the oscillator circuit to another portion of the oscillator circuit to render the oscillator circuit capable of establishing electrical oscillation, the improvement comprising:

frequency selective circuit means disposed in the feedback path to cause the path to present a relatively high impedance to feedback signals within a certain frequency region and a relatively low impedance to feedback signals without said certain frequency region so that the oscillator circuit is incapable of operating at oscillation frequencies within said certain frequency region, said frequency selective circuit means comprising a parallel resonant circuit, said parallel resonant circuit being disposed in series with the feedback path and being tuned to resonate within said certain frequency range to present a relatively high impedance to the passage of signals within said range and to present a relatively low impedance to signals without said range.

References Cited

UNITED STATES PATENTS

| | | | |
|---|---|---|---|
| 2,763,732 | 9/1956 | Rockwell | 330—100 X |
| 2,903,517 | 9/1959 | Ridings | 179—2 |
| 3,217,269 | 11/1965 | Rowley et al. | 331—113 |
| 3,199,508 | 8/1965 | Roth | 128—2.06 |

OTHER REFERENCES

Electronic Engineering—Letters to the Editor, December 1958, pp. 724–725.

ROBERT L. GRIFFIN, *Primary Examiner.*

J. T. STRATMAN, *Assistant Examiner.*

U.S. Cl. X.R.

128—2.06; 307—291; 330—100; 331—113, 144, 177; 332—17; 340—208

UNITED STATES PATENT OFFICE

CERTIFICATE OF CORRECTION

February 4, 1969

Patent No. 3,426,150

William H. Tygart

It is certified that error appears in the above identified patent and that said Letters Patent are hereby corrected as shown below:

In the sheets of drawings and in the heading to the printed specification, the title of the invention "SYSTEM FOR FM TRANSMISSION OF CARDIOLOGICAL DATA OVER TELEPHONES LINES" should read -- SYSTEM FOR FM TRANSMISSION OF DATA OVER AN AUDIO COMMUNICATION LINK --.

Signed and sealed this 24th day of March 1970.

(SEAL)

Attest:

Edward M. Fletcher, Jr.

Attesting Officer

WILLIAM E. SCHUYLER, JR.

Commissioner of Patents